United States Patent
Ludwig et al.

(10) Patent No.: US 6,729,343 B2
(45) Date of Patent: May 4, 2004

(54) VALVE ARRANGEMENT FOR CONTROLLING THE FLOW RATE OF A GAS

(75) Inventors: Bernhard Ludwig, Lübeck (DE); Tilmann von Blumenthal, Lübeck (DE); Ralf Lorenzen, Lübeck (DE)

(73) Assignee: Dräger Medical AG & Co. KGaA, Lübeck (DE)

(*) Notice: Subject to any disclaimer, the term of this patent is extended or adjusted under 35 U.S.C. 154(b) by 211 days.

(21) Appl. No.: 10/100,567

(22) Filed: Mar. 18, 2002

(65) Prior Publication Data
US 2002/0179147 A1 Dec. 5, 2002

(30) Foreign Application Priority Data
Jun. 1, 2001 (DE) .......................... 101 26 821

(51) Int. Cl.⁷ ................................. G05D 7/06
(52) U.S. Cl. .......................... 137/14; 137/486
(58) Field of Search ................ 137/486, 487.5, 137/14

(56) References Cited

U.S. PATENT DOCUMENTS 5,265,594 A 11/1993 Olsson et al.
5,927,275 A * 7/1999 Loser et al. ............ 128/205.24
6,152,162 A * 11/2000 Balazy et al. ............... 137/486
6,561,216 B2 * 5/2003 Kurosawa .................... 137/486

OTHER PUBLICATIONS

Hamilton Veolar 1988 Edition Intensive Care Respirator Manual.

* cited by examiner

Primary Examiner—Kevin Lee
(74) Attorney, Agent, or Firm—McGlew and Tuttle, P.C.

(57) ABSTRACT

A valve arrangement is provided with a very short minimum valve adjustment time. This is especially suitable for use in respirators or anesthesia apparatuses for metering gases for respirated patients. It has a valve (3, 4) with a seat (3) and with a valve closing part (4) for adjusting the gas flow rate, an inflow line (1) and a discharge line (2) as well as a drive system (5) for controlling the position of the valve closing part (4) relative to the seat (3). A gas flow rate measuring transducer (8) and a control unit (9) are provided for controlling the drive system (5) by means of a control signal. A velocity measuring transducer (7) for measuring the velocity of the valve closing means (4) relative to the seat (3) is present to provide an output signal used to calculate the control signal (40) for the drive system (5).

20 Claims, 2 Drawing Sheets

VALVE ARRANGEMENT FOR CONTROLLING THE FLOW RATE OF A GAS

FIELD OF THE INVENTION

The present invention pertains to a valve arrangement for controlling the flow rate of a gas with a valve, with a crater or valve seat and with a valve closing arrangement for adjusting the gas flow rate

BACKGROUND OF THE INVENTION

A prior-art valve arrangement is disclosed, e.g., in U.S. Pat. No. 5,265,594 with arrangements used especially in respirators. The arrangement generates different time-dependent respiration patterns for the patient. These are characterized by the gas flow as well as the respiration pressure at the patient, by means of the gas metering. The apparatuses are connected to a central gas supply for this purpose. The metering valve has the task of supplying the patient with a defined gas flow or to admit a defined overpressure to the patient. The needed mass flow rate or gas volume flow rate is set for this, in general, by changing the cross-sectional area of the gas line carrying the flow. The cross-sectional area of the gas line through which the gas flows is specially designed as a cylinder jacket surface, which is obtained from the circular valve cross section and the linear valve opening path located at right angles thereto. To set the cross-sectional area of the gas line through which the gas flows, an electrically actuated linear drive system is preferably used, whose force adjusts the valve opening path. The movement of the closing means of these prior-art electromechanical valve arrangements is damped very weakly due to the principle involved and it therefore tends to vibrate, especially when the valve arrangement is operated within a simple control circuit for the valve opening path, the gas flow or the patient pressure. Another prior-art arrangement is also shown in the *Handbuch für das Intensivbeatmungsgerät Hamilton Veolar* [Manual for the Hamilton Veolar Intensive Care Respirator], 1988 edition. A valve arrangement that meters a volume flow rate from a reservoir with variable pressure is described there. The arrangement is based in the control circuit for the gas flow rate on a displacement sensor, which measures the valve opening path. An attempt is made at increasing the stability of this control circuit by differentiating the signal of the valve opening path and superimposing it to the actuating signal of the drive system. The signal disturbances are amplified and the signal is, moreover, delayed in time due to the differentiation with this type of signal generation, so that the use of a signal obtained in this manner for damping has only limited effectiveness. One essential drawback of this prior-art valve arrangement is therefore that an acceptable build-up characteristic is given only up to a minimum valve adjustment time of a few millisec.

SUMMARY AND OBJECTS OF THE INVENTION

The object of the present invention is to provide an improved prior-art valve arrangement which makes it possible to markedly shorten the minimum valve adjustment time, to about half, at an equal build-up characteristic.

According to the invention, a valve arrangement for controlling the flow rate of a gas is provided with a valve with flow passage opening valve part, such as a crater or valve seat with a valve closing means for adjusting the gas flow rate. The arrangement includes an inflow line, a discharge line, a drive system for controlling the position of the valve closing means relative to the crater, a gas flow rate measuring transducer, and a velocity measuring transducer for measuring the velocity of the valve closing means relative to the crater providing an output signal. A control unit is provided for controlling the drive system by a control signal with the velocity measuring transducer output signal used to calculate the control signal for the drive system.

If the desired mass flow rate or gas volume flow rate, i.e., the gas flow rate, is to be set quickly and accurately, the movement of the closing means of the valve arrangement must be additionally damped from the outside, because a high degree of damping improves the possibility of adjusting the valve with little overshooting and rapidly. The damping is preferably accomplished according to the present invention by negatively sending the velocity of the closing means to the drive system. To achieve the necessary maximum effectiveness of damping, a velocity signal that is highly dynamic and especially has little disturbance and delay is used. The present invention correspondingly uses a means that obtains the velocity signal directly by measurement and ensures that this happens with only minimal time delays and disturbances. The valve adjustment time is markedly reduced as a result by about 50% while the design of the valve arrangement otherwise remains unchanged.

Due to the reduction of the valve adjustment time for the desired gas flow rate, it is also possible as a result to increase the rate of pressure rise at the patient.

It is also advantageous that due to the increased damping, the valve is able to cover an extended admission pressure range with approximately constant valve adjustment time for the gas flow rate.

The control signal for the drive system may be determined by forming the difference from a gas flow rate set point, the output signal of a velocity signal conditioner and the output signal of a gas flow rate signal conditioner. The control signal for the drive system may be determined by additionally forming the difference between the output signal of a current signal conditioner. The control signal for the drive system may be determined by forming the difference from the pressure set point, the output signal of the velocity signal conditioner and the output signal of the pressure signal conditioner. The control signal for the drive system may be determined by additionally forming the difference from the output signal of the current signal conditioner.

The control signal for the drive system may be determined by forming the difference from the pressure set point, the gas flow rate set point, the output signal of the velocity signal conditioner, the output signal of the gas flow rate signal conditioner, and the output signal of the pressure signal conditioner. The control signal for the drive system may be determined by additionally forming the difference from the output signal of the current signal conditioner.

The drive system designed may be for example an electrodynamic drive, an electromagnetic drive or a piezoelectric drive system.

The gas flow rate measuring transducer may be a thermal mass flow sensor. The gas flow rate measuring transducer may be a sensor based on a differential pressure measurement over a fixed pneumatic resistor.

The gas flow rate measuring transducer may be a sensor based on differential pressure measurement over an opening gap between the flow passage opening valve part e.g., the valve orifice and the valve closing means. The opening gap between the closing means and the valve part forming the orifice may be measured by means of a position sensor.

The velocity measuring transducer may be an electrodynamic sensor and may be placed preferably in the magnetic field of the drive system.

The ratio of the admission pressure before the valve and the back pressure behind the valve may advantageously be between 2 and 10. The ratio of the admission pressure before the valve and the back pressure behind the valve may advantageously be between 1 and 2.

The invention is particularly useful when used with respirators and anesthesia apparatuses for metering gas for respirated patients.

An exemplary embodiment of the present invention will be explained below on the basis of the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
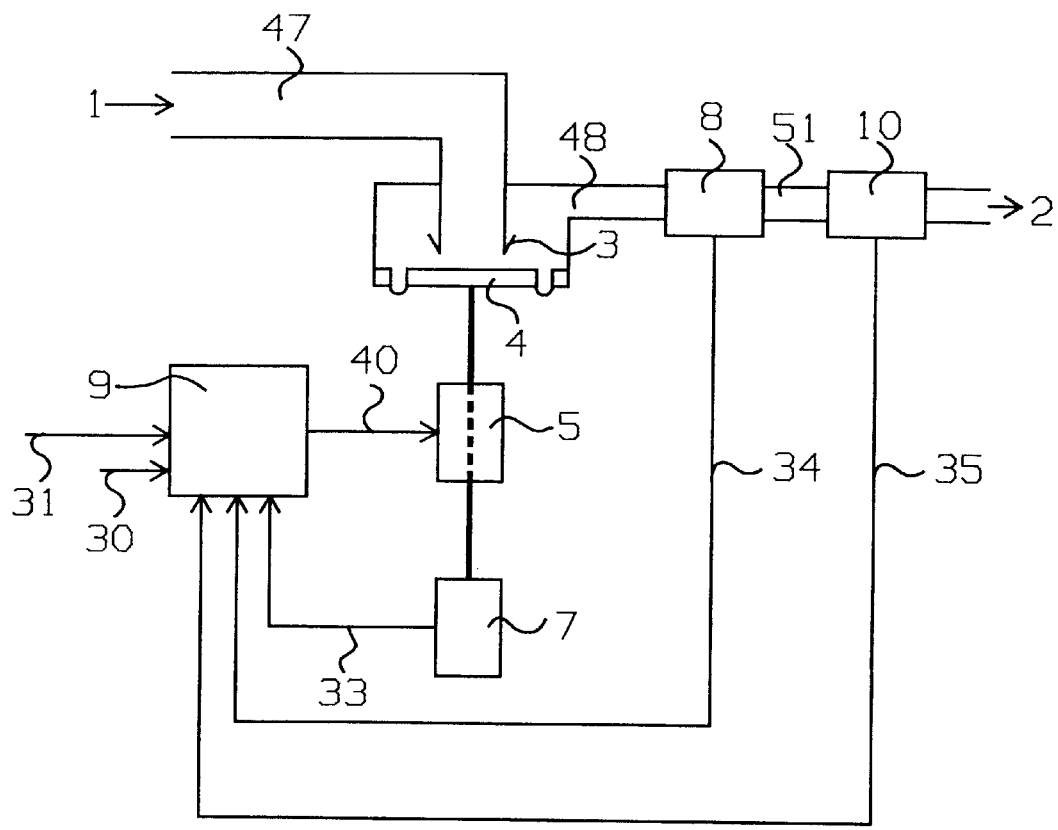
FIG. 1 is a valve arrangement according to the present invention with electrodynamic valve drive.

Referring to the drawings in particular, the valve arrangement according to the present invention shown in FIG. 1 has an inflow line 1 for the gas to be metered and a discharge line 2. The gas flow rate, i.e., the mass flow rate or the volume flow rate, is controlled by means of the valve 3, 4 with the partial elements comprising crater, seat or valve part 3 and valve closing means 4, here a membrane, and the drive system 5, here an electrodynamic linear drive. The electrodynamic linear drive, which is advantageously used, uses a moving coil in a stationary magnetic field. It is thus characterized by extremely small moving masses as well as the possibility of developing driving forces in both directions of action. The mass flow rate or the gas volume flow rate is adjusted based on the position of the membrane relative to the seat 3 by means of the electrodynamic linear drive. This additionally has, besides its drive winding, a second winding for the inductive velocity measurement, i.e., a velocity measuring transducer 7. A prior-art gas flow rate measuring transducer 8, e.g., a hot wire anemometer, is located in FIG. 1 in the discharge line 2, which carries the back pressure 48, as alternatively in the inflow line 1, which carries the admission pressure 47. A control unit 9 receives a gas flow rate set point 30, a pressure set point 31, the gas flow rate measured value 34 from the gas flow rate measuring transducer 8, the velocity measured value 33 of the membrane and of the moving masses connected thereto from the velocity measuring transducer 7, as well as the pressure measured value 35 from the pressure measuring transducer 10. The control unit 9 generates a control signal 40 for the electrodynamic linear drive from this.

Figure 2:
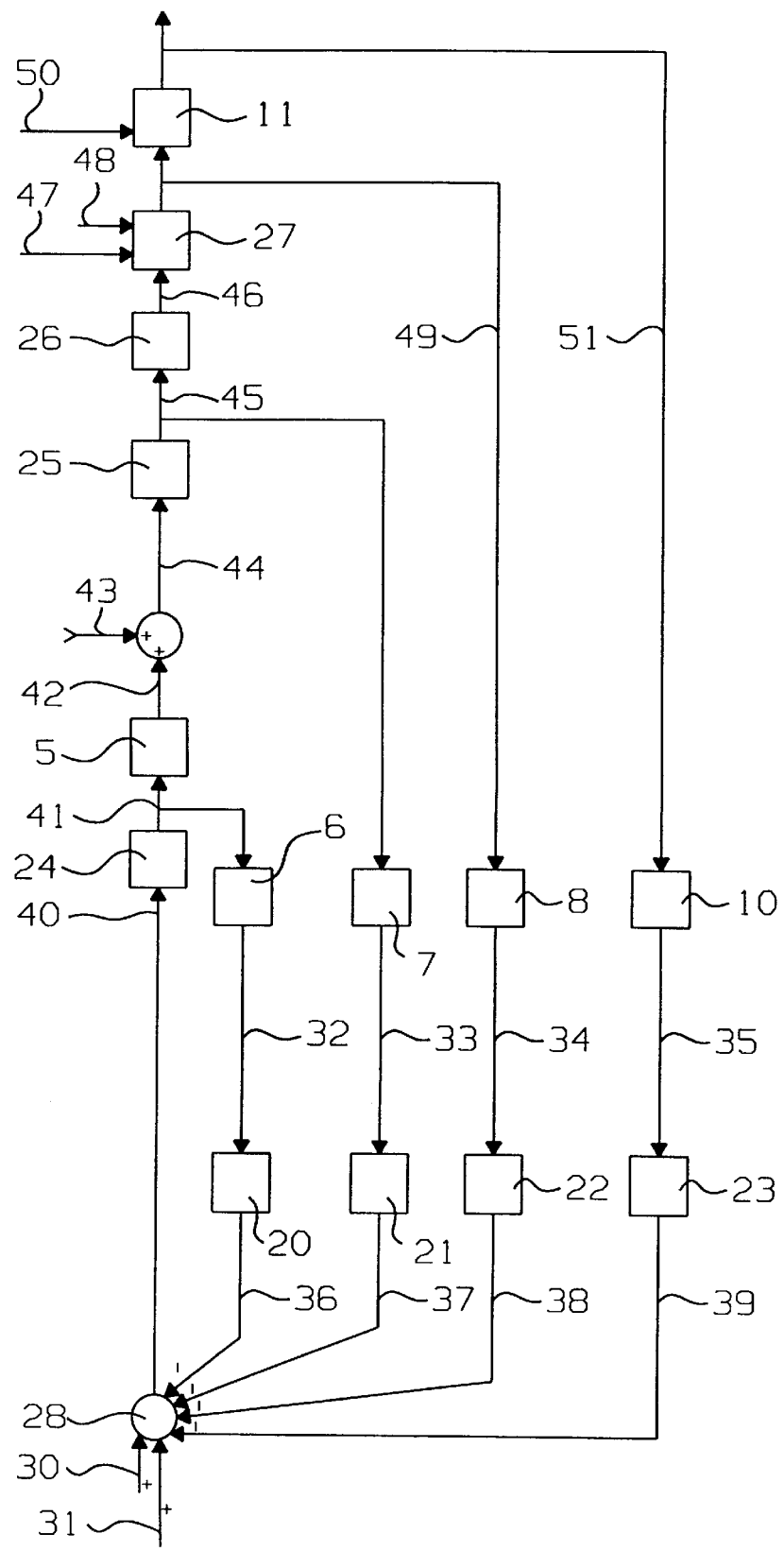
FIG. 2 is a schematic view of the control circuit of a valve arrangement according to the present invention.

FIG. 2 shows a valve arrangement control diagram according to the present invention with electrodynamic valve drive. The valve 3, 4 is thus controlled as follows:

The control signal 40 generates the actuating current 41 for the drive system 5 in the drive inductance 24. The driving force 42 of the drive system yields, together with the disturbing forces 43, the acceleration 44, which acts on the moving parts and leads to the velocity 45 of the membrane via the first path integrator 25. On the output side, the membrane position 46 is obtained from the velocity 45 due to the second path generator 26. The gas flow rate 49 is obtained from the membrane position 46, the admission pressure 47 and the back pressure 48 due to the valve characteristic 27. Together with the patient flow 50, this gas flow rate yields the patient pressure 51 in the tube system 11. The actuating current 41 is measured by means of the current measuring transducer 6, and the current measured value 32 is sent to the current signal conditioner 20. The velocity 45 is measured by means of the velocity measuring transducer 7, and the velocity measured value 33 is sent to the velocity signal conditioner 21. The gas flow rate 49 is measured by means of the gas flow rate measuring transducer 8, and the gas flow rate measured value 34 is sent to the gas flow rate signal conditioner 22.

If the gas flow rate is to be adjusted, the control signal 40 for the drive system 5 is determined in the summing unit 28 by forming the difference between the gas flow rate set point 30 and the output signal 36 of the current signal conditioner 20 as well as the output signal 37 of the velocity signal conditioner 21 as well as the output signal 38 of the gas flow rate signal conditioner 22. The pressure set point 31 is zero in this case.

If the patient pressure is to be set, the control signal 40 for the drive system 5 is determined in the summing unit 28 by forming the difference between the pressure set point 31 and the output signal 36 of the current signal conditioner 20 as well as the output signal 37 of the velocity signal conditioner 21 as well as the output signal 39 of the pressure signal conditioner 23. The gas flow rate set point 30 is zero in this case.

Both the current signal conditioner 20 and the velocity signal conditioner 21, the gas flow rate signal conditioner 22 and the pressure signal conditioner 23 have proportional transmission characteristics in their simplest design. Other, especially nonlinear transmission characteristics may, of course, also be advantageously used here. Thus, analog or digital low-pass filters are used to filter the measured values, and the weighting of the signals takes place on the basis of a proportional factor. The amplitude of the resulting signals is maintained within a desired range by a limiter.

The analog velocity measured value 33 is sent to an analog signal processing unit. This contains an analog amplifier as well as an analog summing unit 28. The fact that this signal processing unit is designed as an analog circuit makes possible a maximum signal transmission velocity and it thus ensures the required maximum effectiveness of damping. The actuating current 41 arising from the control signal 40 in the drive system 5 is converted into a voltage by means of a resistor and measured. To obtain the maximum signal transmission velocity, the signal transmission is performed in the analog form in this case as well. After analog preprocessing, the signal processing is performed in the digital form for the gas flow rate measured value 34 as well as for the pressure measured value 35 in order to ensure the maximum possible flexibility for the further signal processing.

While a specific embodiment of the invention has been shown and described in detail to illustrate the application of the principles of the invention, it will be understood that the invention may be embodied otherwise without departing from such principles.

What is claimed is:

1. A valve arrangement for controlling the flow rate of a gas, the valve arrangement comprising:
   a valve, with a seat and with a valve closing means for adjusting a gas flow rate;
   an inflow line;
   a discharge line;
   a drive system for controlling the position of said valve closing means relative to said seat;
   a gas flow rate measuring transducer;
   a control unit for controlling said drive system by a control signal;
   a velocity measuring transducer for measuring the velocity of the valve closing means relative to the seat providing an output signal used to calculate the control signal for said drive system.

2. A valve arrangement in accordance with claim 1, wherein said control unit includes a gas flow rate signal conditioner and a velocity signal conditioner and said control signal for said drive system is determined by forming a difference from a gas flow rate set point, an output signal of said velocity signal conditioner and an output signal of said gas flow rate signal conditioner.

3. A valve arrangement in accordance with claim 2, wherein said control unit includes a current signal conditioner and said control signal for said drive system is determined by additionally forming a difference between an output signal of said current signal conditioner.

4. A valve arrangement in accordance with claim 1, wherein said control unit includes a pressure signal conditioner and a velocity signal conditioner and said control signal for said drive system is determined by forming a difference from said pressure set point, an output signal of said velocity signal conditioner and an output signal of said pressure signal conditioner.

5. A valve arrangement in accordance with claim 4, wherein said control unit includes a current signal conditioner and said control signal for said drive system is determined by additionally forming a difference from an output signal of said current signal conditioner.

6. A valve arrangement in accordance with claim 1, wherein said control unit includes a gas flow rate signal conditioner, a pressure signal conditioner and a velocity signal conditioner and said control signal for said drive system is determined by forming a difference from a pressure set point, a gas flow rate set point, an output signal of said velocity signal conditioner, an output signal of said gas flow rate signal conditioner, and an output signal of said pressure signal conditioner.

7. A valve arrangement in accordance with claim 6, wherein said control unit includes a current signal conditioner and said control signal for said drive system is determined by additionally forming a difference from an output signal of said current signal conditioner.

8. A valve arrangement in accordance with claim 1, wherein said drive system includes an electrodynamic drive.

9. A valve arrangement in accordance with claim 1, wherein said drive system includes an electromagnetic drive.

10. A valve arrangement in accordance with claim 1, wherein said drive system is designed as a piezoelectric drive system.

11. A valve arrangement in accordance with claim 1, wherein said gas flow rate measuring transducer is a thermal mass flow sensor.

12. A valve arrangement in accordance with claim 1, wherein said gas flow rate measuring transducer includes a sensor based on a differential pressure measurement over a fixed pneumatic resistor.

13. A valve arrangement in accordance with claim 1, wherein said gas flow rate measuring transducer is a sensor based on differential pressure measurement over an opening gap between said seat and said valve closing means, wherein the opening gap is measured by means of a position sensor.

14. A valve arrangement in accordance with claim 1, wherein said velocity measuring transducer is an electrodynamic sensor and is placed in the magnetic field of said drive system.

15. A valve arrangement in accordance with claim 1, wherein the ratio of admission pressure before said seat and valve closing means and back pressure behind said seat and valve closing means is between 2 and 10.

16. A valve arrangement in accordance with claim 1, wherein a ratio of admission pressure before said seat and valve closing means and back pressure behind said seat and valve closing means is between 1 and 2.

17. A valve arrangement in accordance with claim 1 in combination with one or more of a respirator and anesthesia apparatus for metering gas for respirated patients.

18. A valve system controlling the flow rate of a gas, the system comprising:
   a valve with valve orifice part and a valve closing part, the valve closing part being movable between a closed position with the valve closing part in contact with the valve orifice part and an open position;
   an inflow line connected to said valve;
   a discharge line connected to said valve;
   a drive system for controlling the position of said valve closing part relative to said valve orifice part;
   a gas flow rate measuring transducer;
   a velocity measuring transducer for measuring the velocity of the valve closing part relative to the valve orifice part and providing a measured closing part velocity output signal;
   a control unit for controlling said drive system by a control signal based in part on the measured closing part velocity output signal.

19. A valve arrangement in accordance with claim 18, further comprising a pressure measuring transducer, wherein said control unit includes a measured closing part velocity signal conditioner and at least one of a pressure signal conditioner and a gas flow rate signal conditioner and said control signal is formed from a difference of a gas flow rate set point signal, an output signal of said velocity signal conditioner and one or more of an output signal of said gas flow rate signal conditioner and an output signal of said pressure signal conditioner.

20. A method of controlling the flow rate of a gas, the method comprising the steps of:
   providing a valve with valve orifice seat and a closing part;
   connecting an inflow line to the valve;
   connecting a discharge line to the valve;
   controlling the position of the valve closing part relative to the valve orifice seat with a drive system, the closing part being movable between a closed position with the valve closing part in contact with the valve orifice seat and an open position;
   providing a gas flow rate measuring transducer;
   providing a velocity measuring transducer for measuring the velocity of the valve closing part relative to the valve orifice seat and providing a measured closing part velocity output signal;
   using a control unit to control the drive system with a control signal based in part on the measured closing part velocity output signal; and
   metering gas for respirating a patient or administering anesthesia to a patient.

* * * * *